United States Patent Office.

H. C. PUTMAN AND B. F. JOHNSON, OF SQUAW GROVE, ILLINOIS.

Letters Patent No. 68,457, dated September 3, 1867.

IMPROVED WASHING-COMPOUND.

*The Schedule referred to in these Letters Patent and making part of the same.*

TO ALL WHOM IT MAY CONCERN:

Be it known that we, H. C. PUTMAN and B. F. JOHNSON, both of Squaw Grove, in the county of De Kalb, and State of Illinois, have invented a new and useful Washing-Compound; and we do hereby declare that the following is a full and exact description thereof.

The nature of our invention consists in the application of a compound to the washing of cloth, so constituted that by simply boiling the cloth in water in which the compound is dissolved the cloth becomes thoroughly washed without any injury even to the finest fabric.

To enable others skilled in the art to make and use our invention, we will proceed to describe its preparation and use.

The ingredients of our compound are as follows: On two (2) quarts of soft water are taken six (6) ounces of sal-soda, four (4) ounces of lime, eight (8) ounces of common bar-soap, and one (1) ounce of benzole.

The preparation of the compound consists in the following: The sal-soda is put in a dish and one quart of boiling water is poured in. After the soda is dissolved the lime is put in and dissolved also. Another dish is taken, and the soap cut in slices is put in; then another quart of boiling water is poured in and stirred until the soap is thoroughly dissolved. After this is done the contents of the first dish are emptied into the second dish, care being taken, however, to prevent any undissolved, hard particles of lime going with it. The whole then is stirred thoroughly and the benzole added; then again the whole is stirred and mixed thoroughly, when the dish is set aside to cool the compound.

The use of our compound consists in the following: On the evening previous the washing day the cloth to be washed is put in cold water and soaked in it. When the time of washing comes six (6) gallons of soft water have to be taken on the above given quantity of the compound. The water is put in the boiler, and when it commences to boil the compound is added and the cloth put in, and the whole boiled for eight or ten minutes, this being a sufficiently long time to wash any cloth.

What we claim as our invention, and desire to secure by Letters Patent, is—

The washing-compound, consisting of the herein-stated ingredients, taken in quantities and proportions set forth, the whole prepared in the manner herein described and specified.

H. C. PUTMAN,
B. F. JOHNSON.

Witnesses:
E. S. JOHNSON,
G. E. HAY.